US011992122B2

(12) United States Patent
Seltmann et al.

(10) Patent No.: US 11,992,122 B2
(45) Date of Patent: May 28, 2024

(54) FURNITURE DAMPER (71) Applicant: Julius Blum GmbH, Hoechst (AT)

(72) Inventors: Heike Seltmann, Dornbirn (AT);
Matthias Reissig, Lindau (DE)

(73) Assignee: Julius Blum GmbH, Hoechst (AT)

(*) Notice: Subject to any disclaimer, the term of this patent is extended or adjusted under 35 U.S.C. 154(b) by 11 days.

(21) Appl. No.: 18/094,620

(22) Filed: Jan. 9, 2023

(65) Prior Publication Data
US 2023/0157450 A1 May 25, 2023

Related U.S. Application Data (63) Continuation of application No. PCT/AT2021/060238, filed on Jul. 5, 2021.

(30) Foreign Application Priority Data

Jul. 13, 2020 (AT) .............................. A 50606/2020

(51) Int. Cl.
*E05F 5/02* (2006.01)
*A47B 88/477* (2017.01)
*E05F 3/10* (2006.01)

(52) U.S. Cl.
CPC ............ *A47B 88/477* (2017.01); *E05F 3/108* (2013.01); *A47B 2210/0091* (2013.01)

(58) Field of Classification Search
CPC ..... E05F 3/00; E05F 3/10; E05F 3/108; E05F 3/14; E05F 3/16; E05F 3/18; E05F 3/20;
(Continued)

(56) References Cited

U.S. PATENT DOCUMENTS 2,770,003 A * 11/1956 Comey ................... E05F 3/108
188/289
4,066,279 A * 1/1978 Kaptanis ................. E05F 3/02
267/64.11
(Continued)

FOREIGN PATENT DOCUMENTS

AT 010 342 1/2009
AT 12 633 9/2012
(Continued)

OTHER PUBLICATIONS

International Search Report issued Oct. 27, 2021 in International (PCT) Application No. PCT/AT2021/060238.

*Primary Examiner* — Chuck Y Mah
(74) *Attorney, Agent, or Firm* — Wenderoth, Lind & Ponack, L.L.P.

(57) ABSTRACT

A furniture damper includes a damper housing, a fluid chamber therein, a damping fluid therein, and a piston displaceably supported within the fluid chamber. A switch element can be moved, when a damping stroke is below a predetermined pressure threshold value, into a first position in which the channel of the piston is at least partially covered by the switch element and a first flow rate of the damping fluid streams through a channel of the piston. The switch element is also configured to be moved, when the damping stroke is above the predetermined pressure threshold value, from the first position into a second position in which the channel of the piston is at least partially unblocked by the switch element and a second flow rate of the damping fluid streams through the channel of the piston, with the second fluid rate being larger than the first fluid rate.

16 Claims, 5 Drawing Sheets

(58) Field of Classification Search
CPC ... E05F 3/102; E05F 5/00; E05F 5/003; E05F
5/02; E05F 5/06; E05F 5/006; E05F 5/08;
E05F 5/10; E05F 5/022; E05Y 2900/54;
E05Y 2900/548; E05Y 2201/21; E05Y
2201/254; E05Y 2201/256; E05Y
2201/264; E05Y 2201/266; E05Y
2201/412; E05Y 2600/456; E05Y
2900/20; A47B 88/477; A47B 88/473;
A47B 2210/0091; A47B 2210/0044;
A47B 2210/0097
See application file for complete search history.

(56) References Cited

U.S. PATENT DOCUMENTS

| | | | | |
|---|---|---|---|---|
| 4,474,271 | A * | 10/1984 | Molders | B61K 7/025 |
| | | | | 188/62 |
| 4,595,182 | A * | 6/1986 | Freitag | F16F 9/0227 |
| | | | | 267/64.12 |
| 5,507,070 | A * | 4/1996 | Spyche, Jr. | A61G 17/032 |
| | | | | 16/49 |
| 6,802,408 | B2 | 10/2004 | Krammer | |
| 10,865,596 | B2 | 12/2020 | Chen et al. | |
| 2003/0075845 | A1 | 4/2003 | Krammer | |
| 2006/0118371 | A1 * | 6/2006 | Zimmer | F16F 9/368 |
| | | | | 188/280 |
| 2008/0066385 | A1 * | 3/2008 | Roach | E05F 1/1091 |
| | | | | 49/386 |
| 2010/0162521 | A1 * | 7/2010 | Pyo | F16F 9/512 |
| | | | | 16/51 |
| 2012/0085607 | A1 * | 4/2012 | Weber | E05F 5/10 |
| | | | | 188/282.1 |
| 2012/0110914 | A1 * | 5/2012 | Salice | F16F 13/007 |
| | | | | 49/386 |
| 2012/0198654 | A1 * | 8/2012 | Reid | E05F 3/108 |
| | | | | 16/52 |
| 2017/0016260 | A1 * | 1/2017 | Pyo | F16F 9/19 |
| 2017/0254133 | A1 * | 9/2017 | Liang | F16F 9/346 |
| 2019/0133320 | A1 | 5/2019 | Chen et al. | |
| 2020/0011110 | A1 * | 1/2020 | Boundy | B23B 49/026 |
| 2020/0240190 | A1 * | 7/2020 | Held | F16F 9/443 |
| 2022/0049534 | A1 * | 2/2022 | Wittelsbürger | E05F 1/1091 |
| 2022/0112755 | A1 * | 4/2022 | Boundy | E05D 11/0009 |

FOREIGN PATENT DOCUMENTS

| | | |
|---|---|---|
| AT | 15609 | 3/2018 |
| CN | 101672339 | 2/2012 |
| DE | 202 21 550 | 6/2006 |
| DE | 20 2018 103 818 | 8/2018 |
| DE | 20 2019 100 230 | 5/2020 |
| JP | 48-21377 | 6/1973 |
| JP | 59-113332 | 6/1984 |
| JP | 2019-84341 | 6/2019 |
| KR | 10-2006-0094249 | 8/2006 |

\* cited by examiner

FURNITURE DAMPER

BACKGROUND OF THE INVENTION

The present invention relates to a furniture damper for dampening a movement of a movably-supported furniture part. the furniture damper comprises a damper housing, at least one fluid chamber arranged in the damper housing, a damping fluid arranged in the fluid chamber, and at least one piston displaceably supported within the fluid chamber and having at least one channel for the passage of the damping fluid. In addition, at least one switch element is configured to be moved, when a damping stroke is performed and below a predetermined threshold value of a pressure application to the piston, into a first position in which the at least one channel of the piston is at least partially covered by the switch element and wherein a first flow rate of the damping fluid streams through the at least one channel of the piston.

Moreover, the invention concerns a furniture fitting comprising at least one furniture damper of the type to be described.

Such furniture dampers are used, for example, for dampening a closing movement of movable furniture parts (such as drawers, doors or flaps), or for dampening a movement of movably-supported components of furniture fittings so as to prevent a noisy slamming and damages to the furniture parts.

The damping action of the furniture dampers is generated by the flow resistance of a damping fluid arranged in the damper housing. Upon a pressure application, the piston is displaced within the fluid chamber, and the damping fluid can stream from the high-pressure side to the low-pressure side through piston orifices and/or through a gap formed between the piston and the inner wall of the fluid chamber.

Upon an excessive pressure application to the piston, for example in the event of improper use, a so-called damper bouncing may occur. In such an overload case, the damping fluid can no longer stream through the piston or past the piston in a sufficient amount. The increased pressure can then no longer be dissipated by the damper, so that the piston and the piston rod fixed thereon come to an abrupt halt or bounce back. In an extreme case, the damper housing can burst due to the increased pressure, and the hydraulic damping fluid can leak out from the damper housing.

Overload safety devices for furniture dampers are well-known, for example as disclosed in AT 12 633 U1 and DE 20 2018 103 818 U1 to the present applicant. These overload safety devices usually include a ball pressurized by a spring, and the ball blocks an overload opening of the piston during normal operation (that is to say below a predetermined pressure application to the piston). In an overload case (that is to say above the predetermined pressure application to the piston), the ball unblocks the overload opening of the piston against the force of the spring. As a result, a fluid-conductive connection between the high-pressure side and the low-pressure side can be unblocked. By unblocking this fluid-conductive connection, an increased amount of damping fluid can be transferred from the high-pressure side to the low-pressure side. Therefore, the pressure within the furniture damper can be rapidly dissipated and a burst of the housing of the furniture damper can be prevented.

Such overload safety devices having a spring-loaded ball usually include an increased number of components. Therefore, the costs of the furniture damper in serial production of the furniture damper are also increased.

AT 15609 U1, DE 202 21 550 U1 and CN 101672339 A each disclose furniture dampers with a cylinder and a piston displaceable within the cylinder. The piston includes at least one channel for the passage of the damping fluid, and the channel of the piston can be blocked by a bendable or deformable lamella. Upon an increased pressure application, the channel of the piston can be increasingly blocked by the lamella so as to generate an increased braking force of the furniture damper.

AT 10 342 U1 discloses a furniture damper having a cylinder and a piston displaceable within the cylinder, and the piston includes at least one overload opening for the passage of a damping fluid. Moreover, a closure element configured to be displaced relative to the piston is provided, and the overload opening of the piston can be blocked by the closure element at the beginning of the damping stroke. Accordingly, during normal operation, the damping fluid can stream exclusively through an annular gap formed between the piston and an inner wall of the cylinder. Upon an increased pressure application, the closure element is radially widened so as to reduce the size the annular gap, thereby increasing the flow resistance for the piston. In an overload case, the closure element is radially widened to such an extent that the overload opening of the piston can be unblocked, and the pressure within the cylinder can be rapidly dissipated thereby. A drawback is the fact that the overload opening of the piston is immediately closed at the beginning of the damping stroke and that the damping fluid, during normal use, can only stream through the annular gap formed between the piston and the cylinder. As a result, there is the danger of a damper bouncing. In contrast, the overload opening of the piston is only unblocked in an overload case. Accordingly, the furniture damper, during operation, tends to have a dual switching behavior, and an adaption to the prevailing pressure conditions cannot be sufficiently provided.

SUMMARY OF THE INVENTION

It is, therefore, an object of the present invention to propose a furniture damper of the type mentioned in the introductory part, thereby avoiding the above-discussed drawbacks.

According to the invention, the at least one switch element is configured to be, when the damping stroke is performed and above the predetermined threshold value of the pressure application to the piston, moved from the first position into a second position in which the at least one channel of the piston is at least partially unblocked by the switch element and wherein a second flow rate of the damping fluid streams through the at least one channel of the piston, the second fluid rate of the damping fluid being larger than the first fluid rate.

In other words, the furniture damper includes at least one switch element configured to be moved between at least two positions. In a first position of the switch element, the at least one channel of the piston can be at least partially covered, whereby the damping action of the furniture damper can be controlled in a pressure-dependent manner.

In a second position, in contrast, the switch element serves as an overload-safety device. The switch element, in the second position, again unblocks the at least one channel upon an excessive pressure application to the piston in order to rapidly dissipate the arising pressure of the damping fluid in the damper housing, thereby preventing a damage to the damper housing.

Accordingly, it is no longer necessary to provide an additional overload safety device having a spring-loaded ball, because the switch element serves both as a pressure-dependent control and as an overload safety device. In this way, the number of components of the furniture damper can be reduced, the construction of the furniture damper can be simplified, and a cost-effective production can be provided.

A constructively simple embodiment can be provided when the at least one switch element can be transferred from the first position into the second position and/or from the second position into the first position by flexing or by deformation, preferably in a central region of the switch element.

According to an embodiment, the at least one switch element can adopt a third position in which the switch element unblocks a third flow rate, and the at least one switch element is configured to be moved from the first position into the third position upon a pressure reduction, preferably the third flow rate of the damping fluid being larger than the first flow rate.

In other words, at least three positions of the switch element can be realized hereby. In the first position, the switch element at least partially covers the channel of the piston so as to provide a first damping force. In the second position of the switch element, the overload case is present, in which a channel of the piston can be unblocked by the switch element so as to provide a rapid pressure reduction within the damper housing. In the third position, the channel of the piston is covered by the switch element only to a reduced extent so as to provide a second damping force which is smaller than the first damping force.

During normal operation of the furniture damper, the switch element will thus only be moved between the first position and the third position so as to provide two different damping forces. In the second position, on the contrary, the overload case is present in which the switch element unblocks a channel of the piston in order for the damping fluid to stream more rapid from the high-pressure side to the low-pressure side of the furniture damper.

According to an embodiment, the at least one switch element, in the third position, adopts a substantially flat neutral position, and adopts a flexing position in the second position. In the flexing position, the at least one switch element is at least partially deformed or flexed relative to the neutral position.

Preferably, the at least one switch element, in the first position, adopts a further flexing position in which the at least one switch element is at least partially deformed or flexed relative to the neutral position, and is deformed or flexed to a lesser extent relative to the flexing position of the second position.

With a preferred embodiment, the at least one switch element:
  is formed by a rubber material or by a plastic material, and/or
  is configured rotationally symmetrical, and/or
  is configured substantially cylindrical, and/or
  is configured substantially as a lamella.

BRIEF DESCRIPTION OF THE DRAWINGS

Further details and advantages of the present invention will be explained with the aid of the following description of figures.

DETAILED DESCRIPTION OF THE INVENTION

Figure 1:
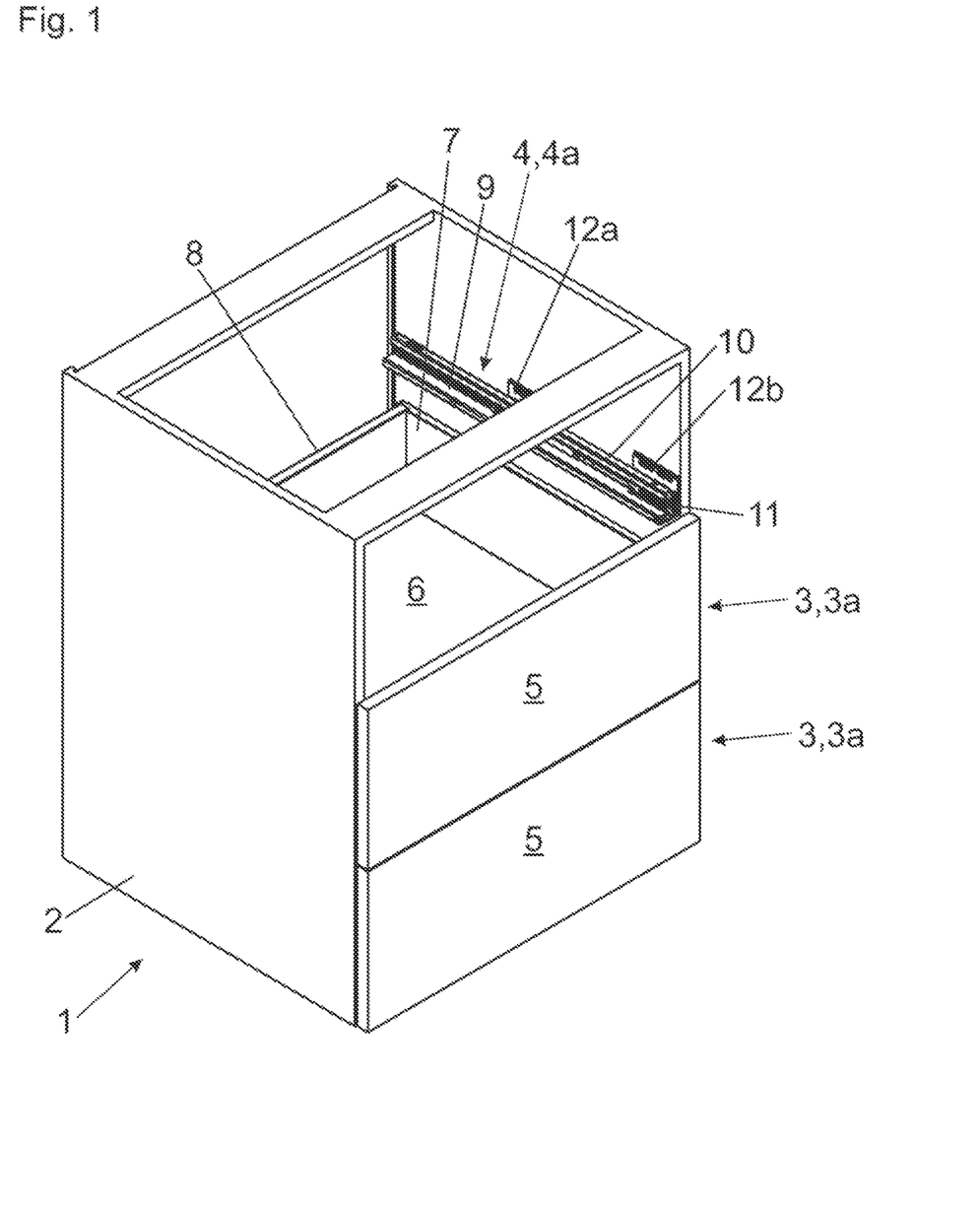
FIG. 1 is a perspective view of an item of furniture comprising a furniture carcass and furniture parts in the form of drawers movably-supported relative to the furniture carcass.

FIG. 1 shows an item of furniture 1 comprising a cupboard-shaped furniture carcass 2, and movable furniture parts 3 in the form of drawers 3a are displaceably supported relative to the furniture carcass 2 via furniture fittings 4 in the form of drawer pull-out guides 4a. Each of the drawers 3a includes a front panel 5, a drawer bottom 6, drawer sidewalls 7 and a rear wall 8.

Each of the drawer pull-out guides 4a includes a carcass rail 9 configured to be fixed to the furniture carcass 2 via at least one fastening portion 12a, 12b, and a drawer rail 10 displaceably supported relative to the carcass rail 9, the drawer rail 10 being connected or being configured to be connected to the drawer sidewall 7. Optionally, the pull-out guide 4a can further include a central rail 11 displaceably supported between the carcass rail 9 and the drawer rail 10 so as to provide a full-extension of the drawer 3a.

Figure 2A:
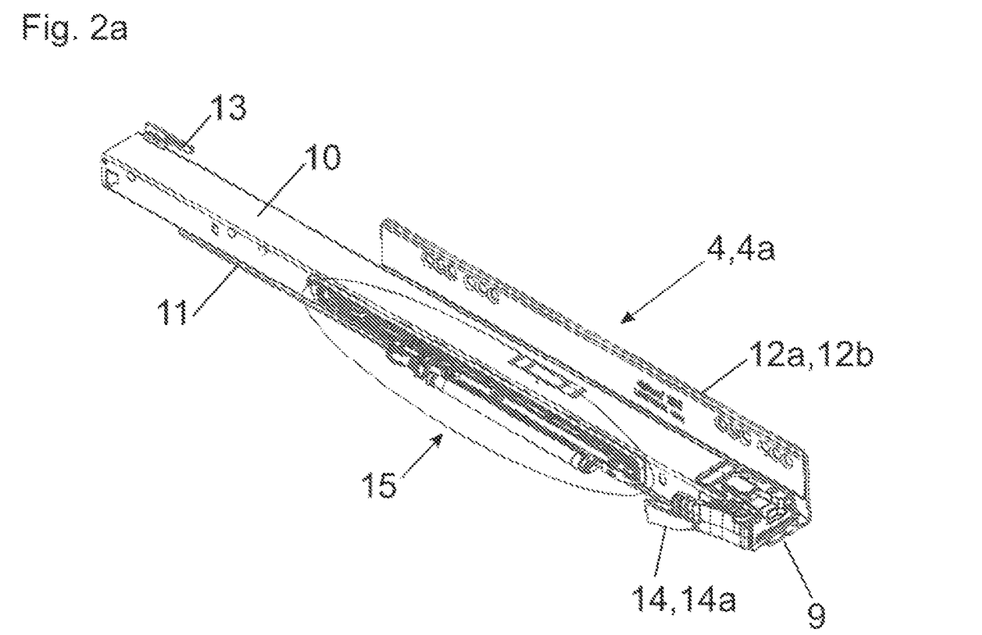
FIG. 2a, 2b show a furniture fitting in the form of a drawer pull-out guide in a perspective view and an enlarged detail view thereof.

FIG. 2a shows the furniture fitting 4 configured as the drawer pull-out guide 4a in a perspective view. The drawer pull-out guide 4a includes the carcass rail 9 configured to be fixed to the furniture carcass 2 via the fastening portion 12a, 12b, the drawer rail 10 configured to be fixed to the drawer 3a, and the central rail 11 is displaceable between the carcass rail 9 and the drawer rail 10.

A, preferably pin-shaped, fastening element 13 is arranged on the rear end of the drawer rail 10, the fastening element 13 engaging into a provided opening of the drawer 3a in a mounted condition of the drawer 3a on the drawer pull-out guide 4a so as to stabilize the rear region of the drawer 3a in a direction extending transversely to the longitudinal extension of the drawer rail 10. A coupling device 14 is arranged on the front end of the drawer rail 10, the coupling device 14 including a coupling portion 14a configured for manual actuation. By the coupling portion 14a, the front region of the drawer 3a can be releasably coupled to the drawer rail 10.

Figure 2B:
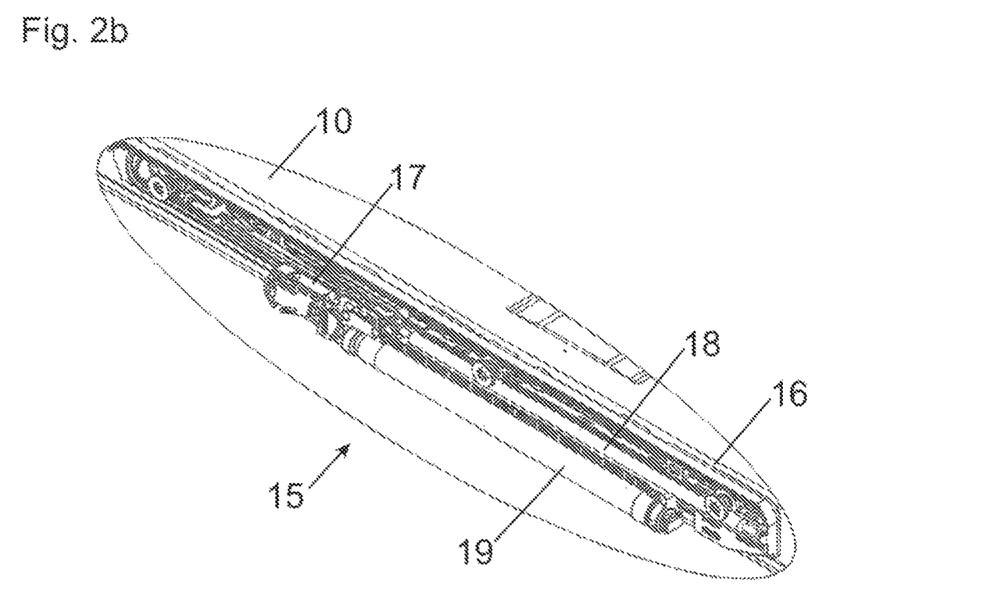

FIG. 2b shows the oval region according to FIG. 2a in an enlarged view. For retracting the drawer rail 10 into a closed end position, an entrainment member 17 pressurized by a spring device 18 is provided. The entrainment member 17 is configured to be releasably coupled to a coupling element arranged on the carcass rail 9 so as to retract the drawer rail 10 into the closed end position by a force of the force storage member 18.

For dampening the spring-assisted retraction movement of the drawer rail 10, a furniture damper 15 with a damper housing 19 is provided. In the shown embodiment, the furniture damper 15 is fixed to the drawer rail 10 via a carrier 16.

Figure 3A:
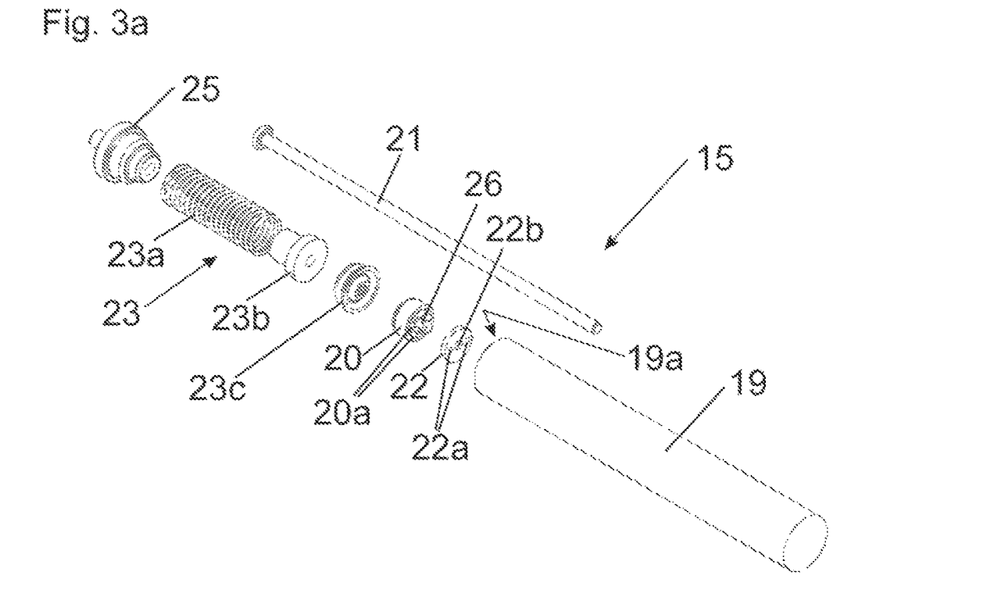
FIG. 3a-3e show the furniture damper in an exploded view and in different positions with an extended and a retracted piston rod.

FIG. 3a shows the furniture damper 15 in an exploded view. The furniture damper 15 includes a, preferably cylindrical, damper housing 19 in which at least one fluid chamber 19a is arranged. A piston 20 with a piston rod 21 is linearly displaceably supported within the fluid chamber 19a.

The piston 20 includes at least one channel 20a, preferably a plurality of channels 20a, for the passage of a, preferably hydraulic, damping fluid arranged in the fluid chamber 19a.

Further, at least one switch element 22 is provided. The switch element 22, when a damping stroke is performed and below a predetermined threshold value of a pressure application to the piston 20, is configured to be moved into a first position in which the at least one channel 20a of the piston 20 is at least partially covered by the switch element 22 and a first flow rate of the damping fluid streams through the at least one channel 20a of the piston 20.

The switch element 22 can include at least one hole 22a, preferably precisely two holes 22a, the at least one hole 22a being in a fluid-conductive connection or being configured to be brought into a fluid-conductive connection with the channel 20a of the piston 20.

The piston 20 includes at least one bearing location 26, and the at least one switch element 22 is movably supported on the bearing location 26, preferably in an axial direction of the piston 20.

The piston rod 21 can be immersed into the fluid chamber 19a, whereby the volume of the fluid chamber 19a is variable. By a compensation device 23 configured to be deformed or moved so as to vary a change of the volume of the fluid chamber 19a, the additional volume of the piston rod 21 can be compensated for upon an entry into the fluid chamber 19a. The compensation device 23 can include a deformable material portion arranged in the fluid chamber 19a or a compensating element 23c displaceable within the fluid chamber 19a. The compensating element 23c is movable against a force of the force storage member 23a upon performing the damping stroke. The force storage member 23a presses against the compensating element 23c via a supporting portion 23b.

By a closure element 25, the damper housing 19 can be closed, and the piston rod 21 is passed through the closure element 25.

Figure 3B:
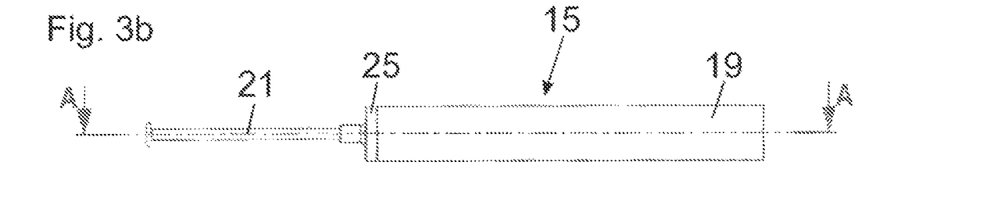
Figure 3C:
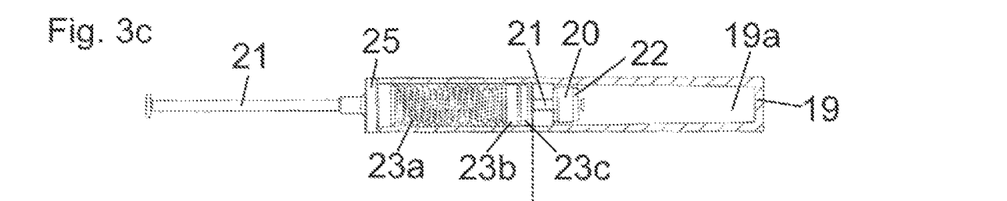

FIG. 3b shows the furniture damper 15 in a side view, in which the piston rod 21 is located in an extended position relative to the damper housing 19. FIG. 3c shows a cross-sectional view along the plane A-A according to FIG. 3b. The piston 20 located within the fluid chamber 19a can be seen.

Figure 3D:
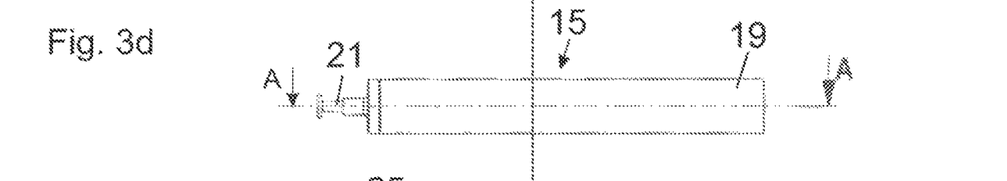

FIG. 3d shows the furniture damper 15 in a side view, in which the piston rod 21 and the piston 20 are located in a retracted end position relative to the damper housing 19.

Figure 3E:
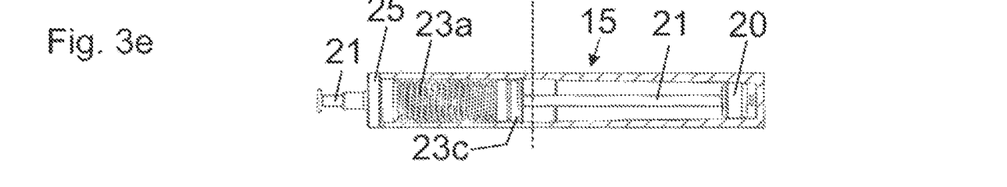

FIG. 3e shows a cross-sectional view along the plane A-A according to FIG. 3d. The additional volume of the piston rod 21 received in the fluid chamber 19a can be compensated for by the compensation device 23. It can be seen that the compensating element 23c of the compensation device 23, in a direct comparison with FIG. 3c, has slightly been moved to the left against a force of the force storage member 23a upon the entry of the piston rod 21. In FIG. 3e, the force storage member 23a is in a more compressed condition than in FIG. 3c. However, such compensation devices 23 are well-known and need not to be further described in detail here.

FIG. 4a-4d show the furniture damper 15 with the different positions (A, B, C, D) of the switch element 22. The damper housing 19 with the fluid chamber 19a arranged therein can be seen, the fluid chamber 19a having a high-pressure side (HP) and a low-pressure side (LP) separated from the high-pressure side (HP) by the piston 20. Preferably, the switch element 22 is arranged on the high-pressure side (HP). The piston 20 includes at least one channel 20a, preferably a plurality of channels 20a, for the passage of a damping fluid arranged in the fluid chamber 19a. The piston 20 is connected to the piston rod 21, the piston rod 21 being led out from the damper housing 19.

Figure 4A:
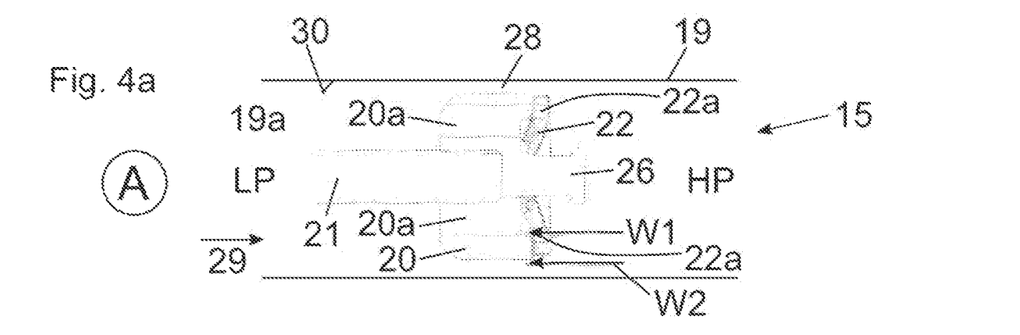
FIG. 4a-4d show the furniture damper with the different positions of the switch element.

FIG. 4a shows the first position (A) of the switch element 22, in which the channel 20a of the piston 20 is at least partially covered by the switch element 22 and in which a first flow rate of the damping fluid streams through the channel 20a of the piston 20. Upon a movement of the piston 20 in a direction 29 of the damping stroke, the damping fluid streams from the high-pressure side (HP) through a gap 28 formed between the switch element 22 and/or the piston 20 and an inner wall 30 of the fluid chamber 19a to the low-pressure side (LP). Moreover, the damping fluid streams from the high-pressure side (HP) through the holes 22a of the switch element 22 and through the channels 20a of the piston 20 to the low-pressure side (LP). This is symbolized by the paths W1, W2.

Figure 4B:
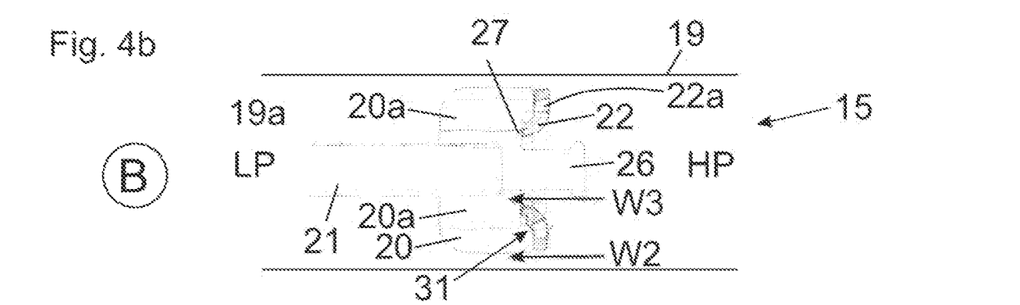
Figure 4C:
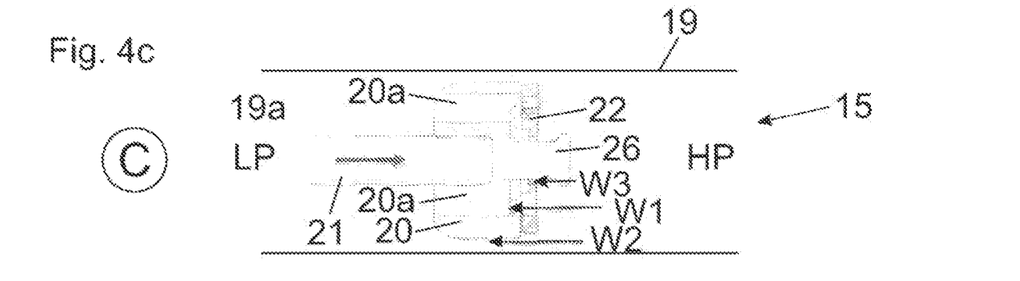

In the first position (A), the switch element 22 adopts a flexing position in which the switch element 22 is at least partially deformed or flexed relative to a flat neutral position (FIG. 4c).

FIG. 4b shows the second position (B) of the switch element 22 and thus the overload case. Upon an excessive, jerky pressure application to the piston 20 in a direction 29 of the damping stroke, the switch element 22 can be transferred from the first position (A) into the second position (B) through flexing or through deformation, preferably in a central region.

The flexing or the deformation of the switch element 22 can be favorized by the central opening 22b of the switch element 22, the central opening 22b having a stepped configuration in diameter in a cross-section. The diameter of the opening 22b can be enlarged by flexing or by a deformation of the switch element 22 so as to increase the flow rate of the damping fluid above the predetermined threshold value of pressure application to the piston 20. In the second position (B) shown in FIG. 4b, the switch element 22 adopts a further flexing position, the further flexing position being stronger deformed or stronger flexed relative to the flexing position of first position (A).

The piston 20 includes at least one, preferably non-symmetrical, abutment 27, and the switch element 22 is configured to bear at least partially against the abutment 27 in the second position (B). The annular gap formed between an outer perimeter of the bearing location 26 and an inner perimeter of the central opening 22b can be significantly enlarged in a region of the path W3 so as to rapidly transport the damping fluid in the overload case via the paths W3, W2 to the low-pressure side (LP). In contrast, in the first position (A) of the switch element 22 (see FIG. 4a), the annular gap is closed in the region of the path W3.

The switch element 22 includes at least one hole 22a, preferably precisely two holes 22a. It can be preferably provided that the at least one hole 22a is peripherally arranged on the switch element 22 and/or can be closed or at least partially closed by bearing against a counter surface 31 of the piston 20.

FIG. 4c shows a third position (C) of the switch element 22, in which the switch element 22 unblocks a third flow rate. Upon a pressure reduction, the at least one switch element 22 can be moved from the first position (A) into the third position (C). Preferably, the third flow rate is larger than the first flow rate. The increased third flow rate is symbolized by the three paths W1, W2, W3.

The switch element 22 can be moved from the third position (C) into the first position (A) and/or from the first position (A) into the third position (C) by flexing or by deformation, preferably in a central region. In the third position (C), the switch element 22 adopts a flat neutral position.

Figure 4D:
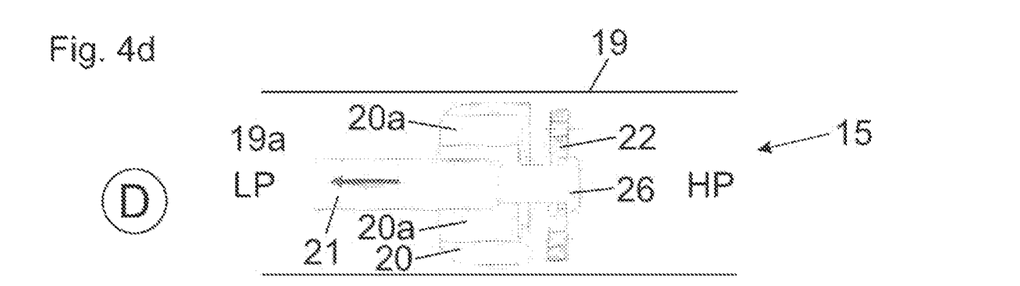

FIG. 4d shows a further position (D) of the switch element 22, in which the switch element 22 unblocks the at least one channel 20a of the piston 20, preferably all channels 20a provided in the piston 20, upon a movement of the at least one piston 20 in a direction opposite the damping stroke. This is the case when the piston rod 21, upon a return stroke, is pulled out from the damper housing 19 in a direction opposite the direction 29 of the damping stroke. By unblocking the channels 20a, a rapid return movement of the piston rod 21 with a low fluid resistance can be made possible.

Figure 5A:
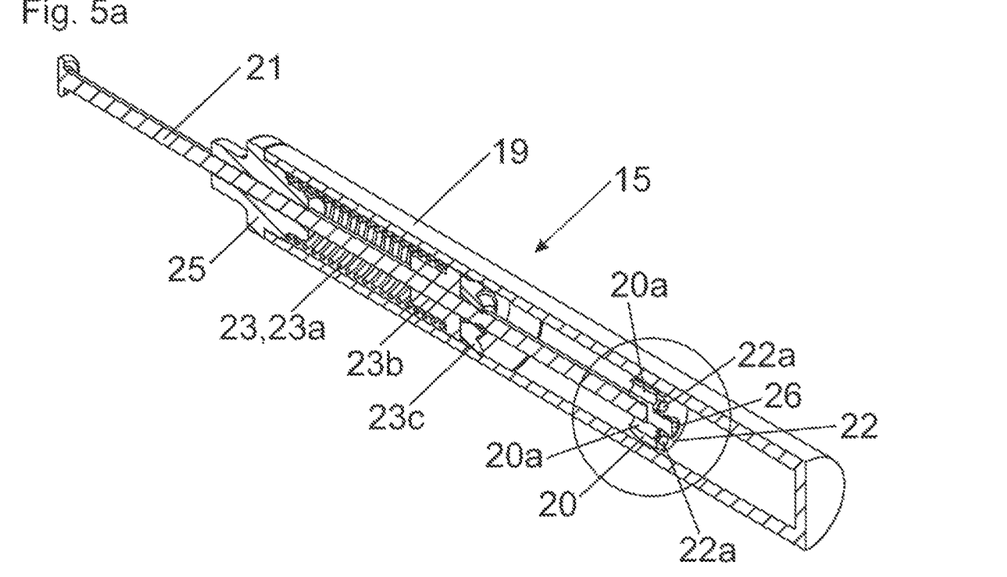
FIG. 5a, 5b show the furniture damper in a perspective cross-sectional view and an enlarged detail view thereof.

FIG. 5a shows the furniture damper 15 with the already described components in a perspective cross-sectional view.

Figure 5B:
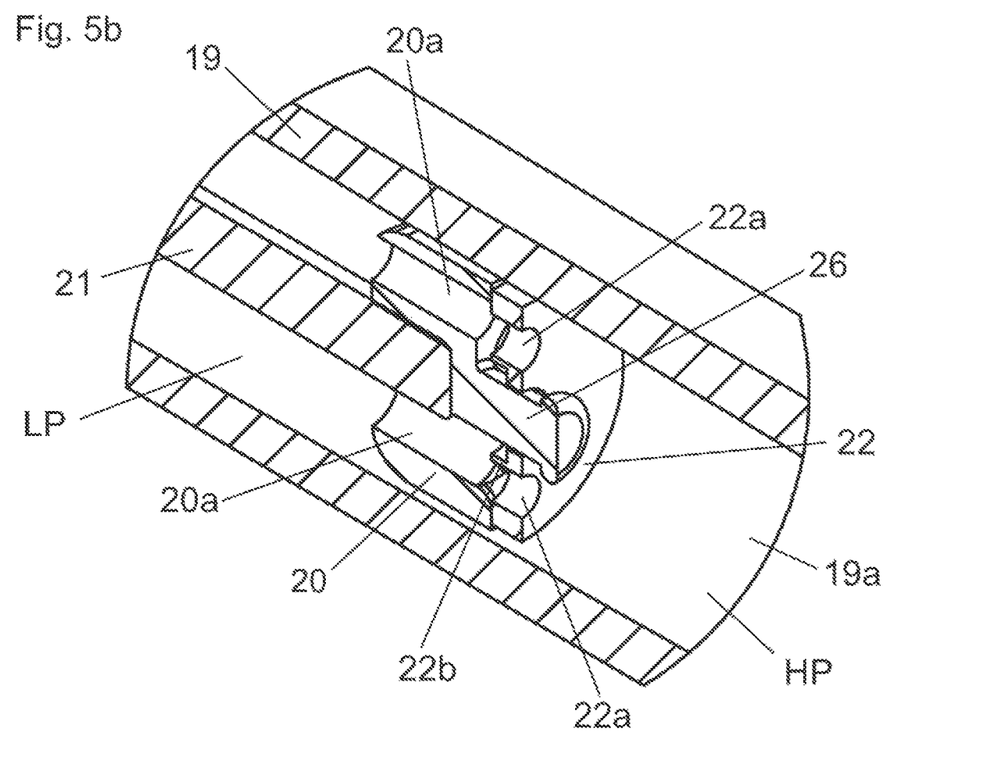

FIG. 5b shows the encircled region of FIG. 5a in an enlarged view. The piston 20 displaceable within the fluid chamber 19a can be seen, and the high-pressure side (HP) and the low-pressure side (LP) are separated from one another by the piston 20. The switch element 22 is displaceably supported on the bearing location 26 of the piston 20 in an axial direction of the piston 20. Well to be seen is the stepped configuration of the central opening 22b and the channels 20a extending through the piston 20. Instead of a stepped configuration, the central opening 22b may also have a conical or a cylindrical configuration in diameter.

The furniture damper 15 according to the invention has been shown in the drawings in combination with a furniture fitting 4 in the form of a drawer pull-out guide 4a. However, it is immediately apparent that the furniture damper 15 can also be applied to other furniture fittings 4.

The furniture fitting 4 can include at least two components configured to be moved relative to one another, and a relative movement of the at least two components can be dampened by the furniture damper 15, and/or that the furniture fitting 4 is configured as a furniture drive for moving a movably-supported furniture part 3, as a furniture hinge for moving a movably-supported furniture part 3, or as a damping device for dampening a movement of a movable furniture part 3.

The invention claimed is:

1. A furniture damper for dampening a movement of a movably-supported furniture part, the furniture damper comprising:
    a damper housing,
    at least one fluid chamber arranged in the damper housing,
    a damping fluid arranged in the fluid chamber,
    at least one piston displaceably supported within the fluid chamber, the piston having at least one channel for the passage of the damping fluid,
    at least one switch element configured to be moved, when a damping stroke is performed and below a predetermined threshold value of a pressure application to the piston, into a first position in which the at least one channel of the piston is at least partially covered by the switch element and wherein a first flow rate of the damping fluid streams through the at least one channel of the piston,
    wherein the at least one switch element, when the damping stroke is performed and above the predetermined threshold value of the pressure application to the piston, is configured to be moved from the first position into a second position in which the at least one channel of the piston is at least partially unblocked by the switch element and wherein a second flow rate of the damping fluid streams through the at least one channel of the piston, the second fluid rate of the damping fluid being larger than the first fluid rate.

2. The furniture damper according to claim 1, wherein the at least one switch element is configured to be moved from the first position into the second position and/or from the second position into the first position by flexing or by deformation, in a central region.

3. The furniture damper according to claim 1, wherein the at least one switch element has a third position in which the switch element unblocks a third flow rate, and wherein the at least one switch element, upon a pressure reduction, is configured to be moved from the first position into the third position, wherein the third flow rate is larger than the first flow rate.

4. The furniture damper according to claim 3, wherein the at least one switch element is configured to be transferred from the third position into the first position and/or from the first position into the third position by flexing or by deformation, in a central region.

5. The furniture damper according to claim 3, wherein the at least one switch element, in the third position, adopts a substantially flat neutral position and, in the second position, adopts a flexing position in which the at least one switch element is at least partially deformed or flexed relative to the neutral position, wherein the at least one switch element, in the first position, adopts a further flexing position in which the at least one switch element is at least partially deformed or flexed relative to the neutral position, and is deformed or flexed to a lesser extent in relation to the flexing position of the second position.

6. The furniture damper according to claim 3, wherein the piston includes at least one bearing location for movably supporting the at least one switch element, wherein the switch element has a central opening and unblocks, in the third position, an annular gap formed between an outer perimeter of the at least one bearing location and an inner perimeter of the central opening, wherein the annular gap can be closed in the first position and/or can be at least partially enlarged in the second position.

7. The furniture damper according to claim 1, wherein the piston includes at least one abutment, and the at least one switch element, in the second position, is configured to at least partially bear against the at least one abutment.

8. The furniture damper according to claim 1, wherein the at least one switch element includes at least one hole, wherein the at least one hole is in a fluid-conductive connection or is configured to be brought into a fluid-conductive connection with the at least one channel of the at least one piston, wherein:
    the at least one hole is peripherally arranged on the switch element, and/or
    the at least one hole, in the second position, can be closed or can be at least partially covered by bearing against a counter-surface on the piston.

9. The furniture damper according to claim 1, wherein the at least one switch element includes a central opening, wherein:
    the opening, in a cross-section, has a stepped, conical or a cylindrical configuration in diameter, and/or
    a diameter of the opening can be enlarged by flexing or by a deformation of the switch element so as to increase the flow rate of the damping fluid above the predetermined threshold value of the pressure application to the piston.

10. The furniture damper according to claim 1, wherein the at least one switch element is formed of a rubber material or a plastic material, and/or is configured substantially rotationally symmetrical, and/or is configured substantially cylindrical, and/or is configured substantially as a lamella.

11. The furniture damper according to claim 1, wherein the at least one piston has an axial direction, wherein the at least one switch element is displaceable in the axial direction relative to the piston, along a bearing location connected to the piston.

12. The furniture damper according to claim 1, wherein the at least one fluid chamber includes a high-pressure side and a low-pressure side which are separated from one another by the at least one piston, wherein it is provided that the at least one switch element is arranged on the high-pressure side of the fluid chamber.

13. The furniture damper according to claim 1, wherein the at least one switch element includes a further position in which the switch element, upon a movement of the at least one piston in a direction opposite the damping stroke, unblocks the at least one channel of the piston.

14. The furniture damper according to claim 1, wherein a piston rod connected to the at least one piston is provided, wherein it is provided that the piston rod is led out from the damper housing of the furniture damper.

15. The furniture damper according to claim 1, wherein a piston rod can be immersed into the fluid chamber so as to vary a volume of the fluid chamber, wherein a compensation device is provided, the compensation device being configured to be deformed or moved so as to vary the volume of the fluid chamber, wherein it is provided that the compensation device includes a deformable material portion arranged in the fluid chamber or a compensating element displaceable within the fluid chamber, wherein the compensating element is movable against a force of a force storage member when a damping stroke is performed.

16. A furniture fitting comprising the furniture damper according to claim 1, wherein the furniture fitting includes at least two components configured to be moved relative to one another and wherein a relative movement of the at least two components can be dampened by the furniture damper, and/or the furniture fitting is configured as a furniture drive for moving a movably-supported furniture part, as a furniture hinge for moving a movably-supported furniture part, as a damping device for dampening a movement of a movable furniture part, or as a drawer pull-out guide for moving a movable furniture part in the form of a drawer.

\* \* \* \* \*